Figure 1:
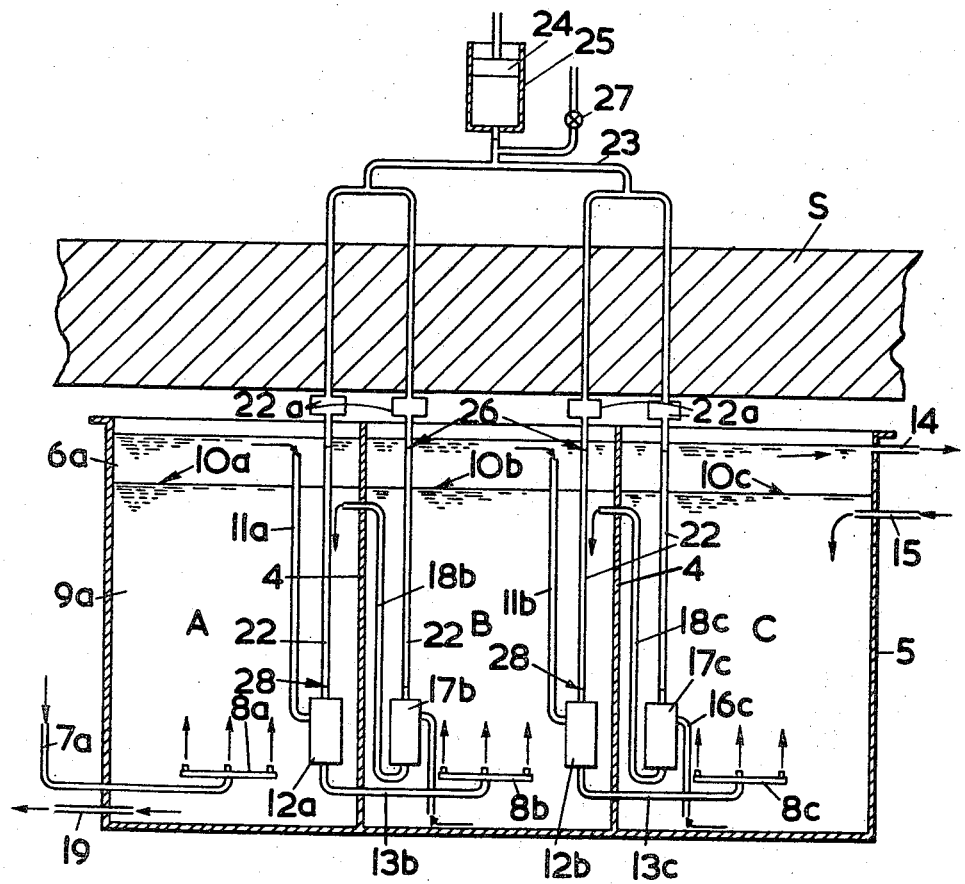

March 24, 1959    J. D. THORNTON    2,879,144
PUMPS
Filed July 1, 1955

JOHN DESMOND THORNTON
Inventor
By Larson and Whiting
Attorney

United States Patent Office 2,879,144
Patented Mar. 24, 1959

2,879,144

PUMPS

John Desmond Thornton, Abingdon, England, assignor, by mesne assignments, to the United States of America as represented by the United States Atomic Energy Commission Application July 1, 1955, Serial No. 519,305

5 Claims. (Cl. 23—270.5)

This invention relates to pumps for conveying liquids, particularly chemical process liquids.

It is often desirable and sometimes imperative to avoid the use of moving mechanical parts in or near a chemical process liquid because of the liability, in the long run, of failure of such parts and the consequent difficulty in replacing them.

The air lift and the injector are devices which avoid the use of moving parts but they each involve entrainment of a further fluid in the liquid being conveyed.

A pump in accordance with the present invention for conveying liquids comprises an injector or eductor adapted to be submerged in or flooded by the liquid to be pumped, a conduit extending from the high velocity nozzle of the injector and means for applying a pulsating pressure to the surface of the liquid in said conduit whereby said surface oscillates between positions in said conduit. During the positive half-cycle of an applied pulse liquid is forced through the high velocity nozzle or jet of the injector and operates in the manner of the well known water injector or eductor and pumps liquid from the main intake to the outlet of the injector. During the negative half-cycle of the pulse liquid flows in reverse through the jet but no reverse pumping action takes place.

The pulsating pressure is preferably pneumatic as distinct from direct and may be derived from any suitable device, such as a piston and cylinder, located in an accessible position and if necessary the gas employed to provide the pneumatic pressure may be inert to the liquid being conveyed.

The invention is particularly applicable for use in liquid-liquid extraction plant comprising a series of columns or mixer-settler units. When columns are used for large scale extraction processes the height of the column is necessarily considerable and the design of the column involves problems of structural engineering. If, also, the process liquids are radioactive and heavy shielding around the column becomes necessary, the cost of the plant and structural difficulties involved become a major consideration.

The sub-division of a column into a plurality of shorter columns arranged at the same horizontal level minimises the structural and shielding difficulties but has required the use of mechanical pumps or at least non-return valves in the series connections between the sub-columns with the introduction of the aforementioned servicing difficulties. When radioactive liquids are being processed servicing is sometimes impossible.

The problem in relation to radioactive extraction plant may be expressed as a general one of feeding a liquid to an extraction column or mixer settler tank against a static head without using a pump or non-return valve having a moving part likely to require maintenance in or near the process liquid.

There is described in the specification of my co-pending patent application Serial No. 439,440, filed June 25, 1954, now Patent No. 2,818,324, issued December 31, 1957, and in Chemical Engineering Progress, Nuclear Engineering Symposium Series, vol. III, a "pulsed column" in which liquid in the column is pulsed via a gas in contact with the liquid and the column is provided with a duct communicating with the column below a surface of a liquid therein.

The present invention may, therefore, be used to advantage in a pulsed column as described in said specification.

In a liquid-liquid contacting apparatus embodying the invention comprising two or more columns or mixer-settler units arranged at substantially the same level and connected in series at the appropriate levels by ducts for carrying the dispersed phase between adjacent columns in one direction and the continuous phase in the opposite direction, a pump in accordance with the invention may be arranged in each duct between adjacent columns each pump preferably being pulsed pneumatically from a common source.

The injectors may, with advantage, be located within the columns or mixer-settler units and a series may be formed by providing vertical division walls in a single large vessel.

The feed to the first unit of a series may either comprise a pump in accordance with the invention or it may comprise conventional feed means and, if necessary, a separate pulsing duct as described in my aforesaid patent.

Figure 2:
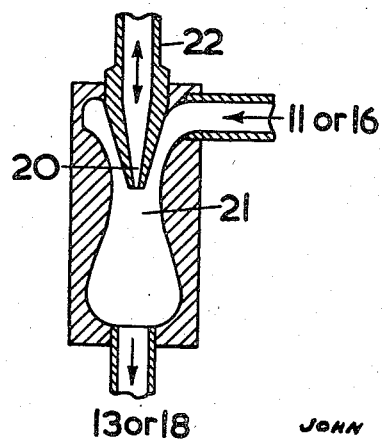

One practical example of the invention embodied in a liquid-liquid extraction plant will now be described with reference to the accompanying drawing wherein:

Fig. 1 is a schematic arrangement of a plant comprising a series of three packed sub-columns and Fig. 2 is a more detailed view to a larger scale of one of the pumps shown in Fig. 1.

In Fig. 1, three sub-columns A, B and C of a total height to give the required extraction efficiency are constructed by providing two partitions 4 in a vessel 5. The sub-columns are randomly packed or are fitted with sieve plates in the known manner but for the sake of clarity the packing has been omitted from the drawing. The dispersed phase such as an organic solvent, is fed into sub-column A through a pipe 7a to a distributor 8a from when it rises in the form of droplets through the continuous phase 9a and coalesces above the liquid-liquid interface 10a. The dispersed phase 6a in sub-column A is then transferred through pipe 11a, injector 12a, pipe 13b and distributor 8b to the bottom of sub-column B where the process is repeated. In sub-column C the dispersed phase overflows through outlet 14.

The continuous phase is fed in counter flow through a pipe 15 into sub-column C just below the interface 10c therein and is transferred from the bottom of sub-column C to a point just below the interface 10b of sub-column B through a dip pipe 16c, injector 17c and riser 18c. Similar transfer of the continuous phase takes place from sub-column B to sub-column A by means of injector 17b and the continuous phase is finally removed through pipe 19 from the bottom of sub-column A.

The injectors 12 and 17 are each as shown diagrammatically in Fig. 2 and comprises a nozzle 20 and venturi throat 21. Each nozzle 20 is connected remotely through a conduit 22 and manifold 23 (Fig. 1) to a piston 24 operating in a cylinder 25 which is shown separated from the columns by a massive shield S, on the assumption that radioactive liquids are being processed.

Both the inlet and outlet connections to the venturi 21 are submerged and the injector is thus flooded. Liquid therefore extends up each conduit 22 to a level between the interface 10 and upper surface of the dispersed phase 6 as indicated at 26. Above this level 26 the conduit 22, manifold 23 and cylinder 25 are filled with gas through a valve 27 and a steady leak is allowed past the piston 24.

On the downstroke of the piston 24 the liquid in each conduit is displaced to a level 28 just above the injector and on the up-stroke of the piston the liquid regains the original level 26. Expansion chambers 22a may, if necessary be included in the conduits 22 to ensure that the process liquid does not rise above the shield 5 or enter the cylinder 25.

The piston 24 is operated at three or four cycles per second and the high velocity liquid flow through the nozzle 20 and venturi 21 causes the transfer of liquid from one sub-column to another as described above. On the up-stroke of the piston the injector functions as a form of non-return valve and, although liquid returns up the conduit 22 from level 28 to level 26, very little pumping action takes place and there is no back-flow of process liquid from one sub-column to another.

The oscillatory movement of the liquid in the conduit 22 does, however, produce a corresponding oscillatory movement of lesser amplitude of the liquid in the sub-columns as and for the purpose described in the specification of my aforesaid patent.

I claim:

1. A pump for pumping liquids comprising an injector having a venturi chamber, an inlet to the chamber at one end of the venturi and an outlet at the other end of the venturi, a pipe leading from the outlet to where the liquid is to be pumped, a high velocity nozzle in the chamber having its tip extending into the inlet end of the venturi, the aforesaid injector being totally submerged in the liquid to be pumped, so that said liquid floods the injector through the inlet, a conduit connected at one end to the nozzle inlet, and extending above the surface of the liquid, a piston and cylinder means above the liquid surface connected to the other end of the conduit, so that the liquid will fill part of the conduit from the nozzle end, the remaining part between the liquid in the conduit and the cylinder defining a gas pocket, the piston and cylinder means being operable to apply a rapidly pulsating pressure to the surface of the liquid in the conduit to cause it to oscillate between a high and low position in the conduit thereby pumping the liquid through the outlet pipe.

2. Multistage continuous liquid-liquid contacting apparatus comprising a vessel having two partitions dividing it into three sub-columns to contain a dispersed liquid phase and a continuous liquid phase at substantially the same levels, the dispersed phase being of a lesser density than the continuous phase, an inlet for the dispersed phase and an outlet for the continuous phase both located near the bottom of the first subcolumn in communication with the continuous phase, a first pump as claimed in claim 1 located near the bottom of the first subcolumn having an inlet pipe leading from the dispersed phase in the first subcolumn and an outlet pipe communicating with the continuous phase in the second intermediate subcolumn near the bottom thereof, a second pump as claimed in claim 1 submerged in the continuous phase near the bottom of the second subcolumn having an outlet pipe leading to the continuous phase in the first subcolumn just below the interface of the two phases, a third pump as claimed in claim 1 located in the second subcolumn near the bottom thereof having an inlet pipe leading from the dispersed phase at the top of the second subcolumn and an outlet pipe communicating with the continuous phase in the third subcolumn near the bottom thereof, a fourth pump as claimed in claim 1 submerged in the continuous phase near the bottom of the third subcolumn having an outlet pipe leading to the continuous phase in the second subcolumn just below the interface between the two phases, an outlet for the dispersed phase and an inlet for the continuous phase both located in the third subcolumn, a single piston and cylinder means replacing the separate piston and cylinder means of each pump, the conduits leading to the nozzles of each of the pumps being connected to the single piston and cylinder means so that the pulsating pressure is distributed to all the columns simultaneously and the high and low positions in said conduits are a level between the interface and uppermost surface of the liquids and a level just above the nozzle respectively.

3. The apparatus of claim 2 adapted for use with radioactive liquids by the provision of a massive radiation shield disposed between the vessel and the piston and cylinder means, the conduits extending through the shield.

4. A pump as claimed in claim 1 including a gas supply pipe to said parts which define the gas pocket.

5. A liquid-liquid extraction apparatus for passing a dispersed liquid phase through a continuous liquid phase comprising two or more mixer-settler units arranged at substantially the same level, and ducts connecting the units in series at appropriate levels for carrying the dispersed phase between adjacent units in one direction and the continuous phase in the opposite direction, and a pump as claimed in claim 1 is provided in each duct for pumping the liquids between adjacent units.

References Cited in the file of this patent
UNITED STATES PATENTS

| | | |
|---|---|---|
| 265,246 | Conord | Oct. 3, 1882 |
| 1,037,071 | Smyth | Aug. 27, 1912 |
| 2,548,807 | Morgan | Apr. 10, 1951 |
| 2,682,452 | Wainwright | June 29, 1954 |